June 23, 1953 A. SIMONS 2,642,892
PRESSURE REDUCING VALVE
Filed Sept. 24, 1946
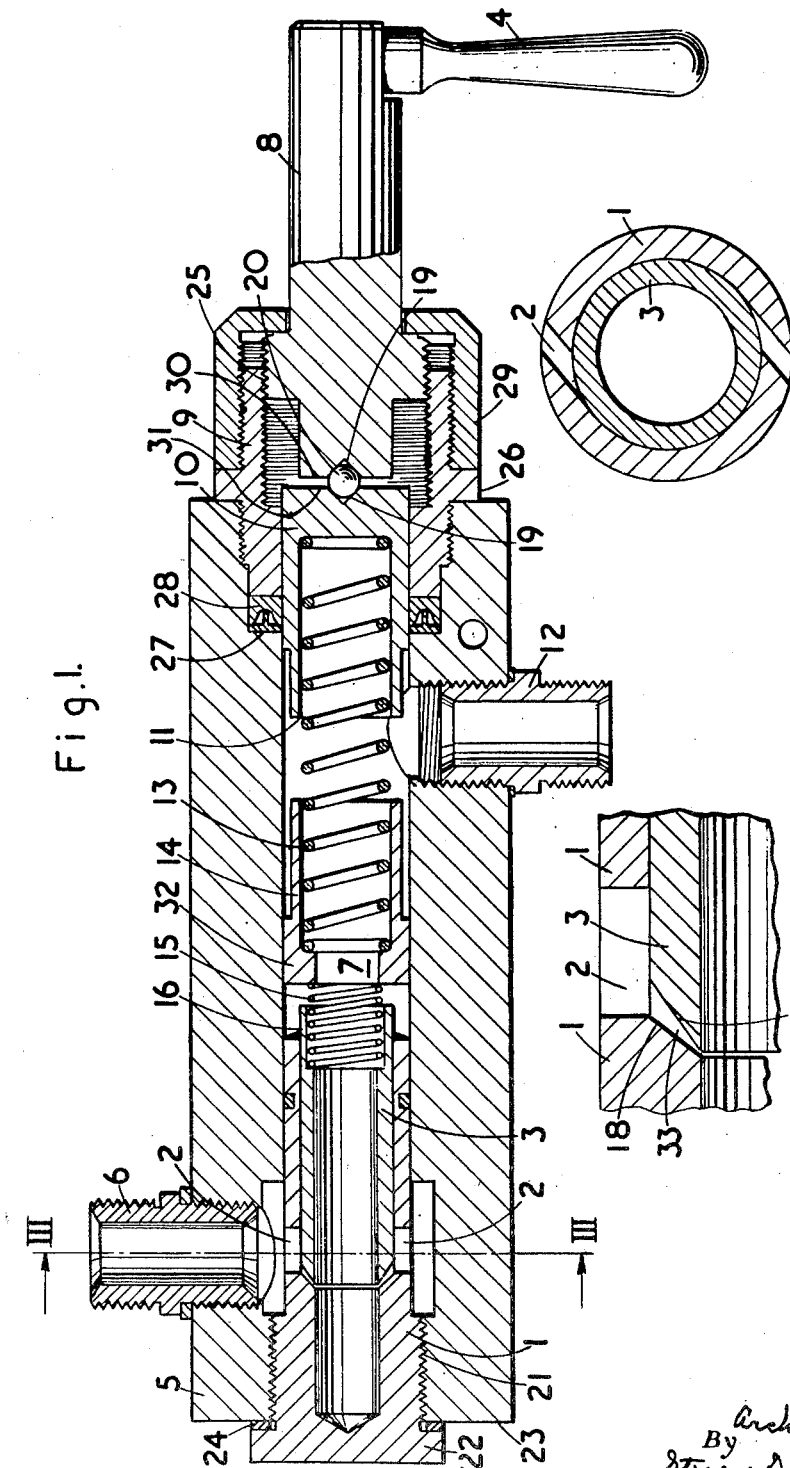
Inventor
Archie Simons
By
Stevens, Davis + Miller
his Attorneys Patented June 23, 1953

2,642,892

UNITED STATES PATENT OFFICE 2,642,892

PRESSURE REDUCING VALVE

Archie Simons, Leicester, England, assignor to Power Jets (Research and Development) Limited, London, England Application September 24, 1946, Serial No. 698,900
In Great Britain October 4, 1945

2 Claims. (Cl. 137—529)

1

This invention relates to improvements in pressure reducing valves intended to control the flow of liquid from a region at higher pressure to another region at lower or zero pressure, and one object of the invention is to obviate the disadvantages inherent in the hitherto known valves.

In such known types of valves, due to the change in condition of the liquid in passing from the higher pressure to the lower pressure through a small orifice, the liquid frequently becomes aerated; i. e., the air which is generally present in solution in said liquid is formed into a large number of minute air bubbles which give rise to irregularity in operation of the pump through which the liquid is passed to raise its pressure in those cases where it is required to recirculate the liquid after its pressure has been again increased. To avoid this irregularity it is necessary in such cases for the liquid at the lower pressure to be passed back to the supply tank to allow the air bubbles to be dissipated before the liquid is allowed to re-enter the pump.

This de-aeration process consequently entails increased piping in the system, and furthermore is not always completely successful especially when the quantity of liquid in the supply tank is not very large in which case the liquid will continue to pass through the system in its aerated condition. This will in turn give rise to unsteady or unstable conditions in the system and is therefore highly undesirable, in particular when the liquid is fuel which is being used for combustion in an engine, for example in a gas turbine engine, and more especially in a gas turbine aero-engine where it is necessary for the pilot of the aircraft to exercise a continuous check on instrument readings which in the case of aerated fuel would be highly irregular.

It is to be understood, however, that although this effect has been particularly noted in the case of fuel intended to be used in burners for gas turbine engines, the invention is not limited to this particular application but has generally wide application in all cases where a liquid is required to be passed in controlled amounts from a higher pressure to a lower pressure.

In order to overcome the above mentioned disadvantages, the valve according to the invention comprises a swirl chamber provided with tangentially directed apertures of adjustable effective area. The liquid at the higher pressure is arranged to enter the swirl chamber through these tangential apertures whereupon the liquid enters into swirling or vortex flow. The pressure drop in this case does not take place directly

2 across a small orifice as in the known valves but gradually across the vortex formed in the swirl chamber, the energy of the liquid being dissipated in whirling movement. There is thus no cause for aeration of the liquid which at the lower pressure is, apart from the difference of pressure, in exactly the same condition as it was at the higher pressure. The liquid leaves the swirl chamber axially at the lower pressure. Where the liquid is required to be recirculated, this permits the liquid at the lower pressure to be led directly to the inlet of the pump instead of leading it back to the supply tank and thus eliminates unnecessary piping.

By way of example one form of embodiment of a valve according to the invention will be described in detail hereinunder with reference to the accompanying drawings, in which:

Figure 1 is a longitudinal section of said embodiment;

Figure 2 is a detail view on an enlarged scale;

Figure 3 is a section of the valving elements on the line III—III of Figure 1.

As shown in Fig. 1 the pressure reducing valve comrises a valve body 5 which is of approximately cylindrical form and is provided with a lateral union 6 for the ingress of high pressure liquid, an axial bore 7 and a lateral union 12 for the egress of low pressure liquid. The union 6 communicates with slots 2 which, as shown in Fig. 3, are tangentially disposed in the wall of a swirl chamber 1 in the form of a hollow cylinder open at one end and closed at the other and provided with an externally threaded portion 21 adapted to engage with a correspondingly internally threaded part of valve body 5. Liquid at high pressure flowing through said slots 2 enters into whirling or vortex flow in the chamber 1, the quantity of liquid entering being controlled by the effective area of the slots 2 which is adjustable by the movement of a sleeve 3 slidably arranged within the chamber 1, one end of said sleeve being adapted to cover or uncover the slots 2 to the desired extent. Liquid at low pressure is led away axially through the sleeve 3. The cylinder 2 is provided at its closed end with a cap 22 adapted to abut against the end wall 23 of cylinder 1 with the interposition of a sealing ring 24.

The sleeve 3 communicates with the axial bore 7 and is movable by the actuation of a control handle 4 rigid with a shaft 8 having an externally threaded part 25 engaging with a correspondingly internally threaded member 9 which is itself screw threaded at 26 within the valve body 5.

The member 9 abuts against the valve body 5 by means of a flange 26 on said member 9, and also abuts against a shoulder 27 formed in the bore 7 through a resilient sealing ring 28. An externally threaded cap nut 29 is adapted to engage a corresponding externally threaded part of the member 9.

The end 30 of the shaft 8 is adapted to bear against the closed end 31 of a hollow plunger 10 slidable within the axial bore 7 and having an open end 11 communicating with the axial duct 7 which itself communicates with the lateral union 12 for egress of low pressure liquid. Within the plunger 10 is arranged a spring 13 of which one end bears against the closed end of said plunger 10, while the other end of spring 13 bears against one face of the flange 32 of a flanged bush 14. Against the opposite face of said flange 32 abuts one end of a second spring 15 which is substantially weaker than spring 13, the other end of spring 15 being held in a collar like extension 16 of sleeve 3 and exerting an axial thrust against the said sleeve.

In order to control the flow of liquid through the above described device, the control handle 4 is rotated so as to move the shaft 8 in the required direction. For example, if it is required to reduce the flow of liquid, handle 4 is rotated in the appropriate direction to urge shaft 8 against the plunger 10. This operation compresses the main spring 13 in said plunger 10, thus moving bush 14 and compressing the light spring 15 which then moves sleeve 3 over the slots 2 in the swirl chamber 1 to diminish the effective area of said slots and thus reduce the quantity of liquid flowing therethrough. On the other hand, if it is required to increase the flow of liquid, the control handle 4 is rotated in the opposite direction to withdraw shaft 8 from plunger 10 in which case sleeve 3 moves back to uncover a greater area of the slots 2 thereby permitting a corresponding greater flow of liquid.

The provision of the two springs 13 and 15 permits the apparatus to be used for two different ranges of pressure; i. e., a lower pressure range and a higher pressure range, the weaker spring 15 being mainly operative for lower pressures and the stronger spring 13 for higher pressures. As shown in Fig. 2 the end wall 17 of sleeve 3 may be bevelled or chamfered or otherwise adapted so that when the slots 2 are completely closed by the sleeve 3, the end 17 does not mate perfectly with the adjacent wall 18 defining one end of the slots 2, a small gap or recess 33 being thus formed between the walls 17, 18 to enable the high pressure liquid to exert a certain amount of thrust on the sleeve 3 in the fully closed position. This enables the sleeve 3 to be more easily moved back to open the slots 2 when it is desired to resume flow of liquid after it has been previously completely cut off.

As a further refinement the end 30 of shaft 8 and the end 31 of plunger 10 may each be provided with a recess 19 to hold a small ball 20, for example, of steel or other suitable material to enable the said ends to rotate freely relative to one another. It will also be understood that if desired three or more springs may be used to operate over three or more ranges of pressure.

I claim:

1. A liquid flow pressure reducing valve comprising a valve body having an inlet for high pressure liquid, said body being internally shaped to form a hollow cylinder affording in part a swirl chamber, the wall of said hollow cylinder being provided with at least one tangentially directed aperture which communicates on the one hand with the interior of the chamber and on the other hand with the inlet thereby imparting a swirling motion to the liquid as it passes into said chamber, a cylindrical valve slidably arranged within said hollow cylinder having a metering edge for controlling the effective area of the tangentially directed aperture and being hollow to afford a bore communicating at one end of the valve directly with said swirl chamber and at the other end with a region of said hollow cylinder remote from the swirl chamber, said valve body having an outlet communicating with said hollow cylinder at said region thereof remote from the swirl chamber, whereby liquid is constrained to flow from the inlet through said aperture into the swirl chamber and thence through the valve bore to the outlet while swirling and so its pressure is gradually reduced.

2. A liquid flow pressure reducing valve according to claim 1 wherein said valve is constrained by differential liquid pressures in one axial direction, further comprising, within said valve body, a first spring element bearing at one end against said valve, a floating bush bearing on one side against the other end of said first spring element, a second spring element bearing at one end against the other side of said floating bush, a platform bearing on one side against the other end of said second spring element, and a shaft bearing on the other side of said platform and adapted for controlled axial movement to adjust the valve, said floating bush and its complementary spring bearing member having, in the case of at least one spring element, stops operative upon reaching a predetermined deflection of the associated spring element to stop further deflection thereof, and the one spring element being substantially weaker than the other spring element, whereby the valve is operable over one pressure range when the deflection of the weak spring element is varied and over a second pressure range when the deflection of the second spring element is varied.

ARCHIE SIMONS.

References Cited in the file of this patent

UNITED STATES PATENTS

| Number | Name | Date |
|---|---|---|
| 1,439,320 | Morse | Dec. 19, 1922 |
| 1,480,594 | Binks | Jan. 15, 1924 |
| 1,791,472 | Ray | Feb. 3, 1931 |
| 1,800,127 | Wilson | Apr. 7, 1931 |
| 1,830,407 | Prenveille | Nov. 3, 1931 |
| 2,005,813 | Thorsen | June 25, 1935 |
| 2,160,657 | Haynes | May 30, 1939 |
| 2,254,472 | Dahl | Sept. 2, 1941 |
| 2,300,466 | Peterson | Nov. 3, 1942 |

FOREIGN PATENTS

| Number | Country | Date |
|---|---|---|
| 6,518 | Great Britain | of 1903 |
| 651 | Australia | of 1931 |